United States Patent [19]

Melcher

[11] Patent Number: 4,517,633
[45] Date of Patent: May 14, 1985

[54] SWITCHED MODE POWER SUPPLY WITH A PLURALITY OF REGULATED SECONDARY OUTLETS

[76] Inventor: Domenic Melcher, Acherstrasse 56, CH-8610 Uster, Switzerland

[21] Appl. No.: 499,766
[22] PCT Filed: Aug. 30, 1982
[86] PCT No.: PCT/CH82/00102
 § 371 Date: May 3, 1983
 § 102(e) Date: May 3, 1983
[87] PCT Pub. No.: WO83/00964
 PCT Pub. Date: Mar. 17, 1983

[30] Foreign Application Priority Data

Sep. 5, 1981 [CH] Switzerland .................. 5695/81

[51] Int. Cl.³ .......................................... H02M 3/335
[52] U.S. Cl. ........................................ 363/21; 363/90; 323/263
[58] Field of Search ............... 323/259, 263, 344, 345; 363/20, 21, 24, 25, 90

[56] References Cited

U.S. PATENT DOCUMENTS 4,055,740 10/1977 Nakamura et al. ............. 323/344 X
4,447,866 5/1984 Reeves ................................. 363/21

FOREIGN PATENT DOCUMENTS 0024523 3/1981 European Pat. Off. .
39817 4/1978 Japan .................... 323/263

OTHER PUBLICATIONS

IBM Technical Disclosure Bulletin, "Low-Insertion-Loss Class A Precision Regulator", J. S. Contino et al., vol. 21, No. 12, May 1979, pp. 4906-4908.

Primary Examiner—William H. Beha, Jr.
Assistant Examiner—Anita M. Ault
Attorney, Agent, or Firm—David Ostfeld

[57] ABSTRACT

The voltage stabilization of the secondary outputs of switched mode power supplies is effected with high efficiency by means of a regulation circuit where the current feeding the storage capacitor (26) is flowing through the primary coil (32) of a transformer (72). One end of the secondary coil (33) of this said transformer (72) is connected to one end of the primary coil (32) via a diode (34), whereas the other end of the secondary coil (33) is connected to the other end of the primary coil (32) via another diode (35) and a switching element (36). The switching element (36) is controlled by a comparator circuit (38) comparing the voltage between the output connectors (40,41) with a reference voltage. In case the output voltage goes below the preset value the switching element (36) is shorted and the storage capacitor (26) is charged at the highest possible voltage. In case the preset value of the output voltage is reached or even exceeded the switching element (36) is cut off and the current induced in the secondary coil (33) is reducing the current flowing from the transformer coil (8) to the storage capacitor (26) by the amount given by the ratio of the number of windings of the secondary coil (33) to the one of the primary coil (32).

8 Claims, 8 Drawing Figures

SWITCHED MODE POWER SUPPLY WITH A PLURALITY OF REGULATED SECONDARY OUTLETS

The present invention refers to a power supply working after the chopper principle and which belongs to the kind named in the introductory part of claim 1.

A special class of power supplies is in its different modifications called "switched mode regulator", "switched mode power supply", "chopper power supply", "dc-dc converter", "ac-dc converter". They are commonly characterized in that a first direct voltage, which generally is neither stable nor regulated, is switched on and off at a frequency of 20 to 300 kc, thereby energizing an electric circuit at this frequency. This said electric circuit comprises means for smoothing the voltage being storage elements at the same time, hence chokes and condensers. The output voltage is compared with a reference voltage by means of a comparator which is controlling the keying ratio of the switched first direct voltage by means of further circuitry as to obtain the required output voltage. In case the desired voltage ist to be derived from the voltage of a public network, it is generally required to have no resistive coupling between the primary and the secondary circuits of such a power supply. In such case, the circuit chopping the first direct voltage is energizing the primary coil of a transformer.

One distinguishes between forward converters and flyback converters depending on the secondary circuitry.

A state-of-the-art description of switched mode power supplies with *one* regulated outlet is in "Schaltnetzteile" by J. Wüstenhube (Editor), Expert Edition, Grafenau/VDE-Edition, Berlin, GDR. In switched mode power supplies with no resistive coupling, a change in output power causes a change of the keying ratio between the two states of the switching element energizing the primary coil of the isolation transformer. In case the isolation transformer of a switched mode power supply has a multitude of secondary coils each feeding an individual outlet, without special measures only the one outlet will have a stable output voltage from which the actual value/setpoint value difference is obtained (from now on called main circuit); the voltages of the other outlets (hence the secondary circuits) are influenced within wide boundaries by the load.

The diagramm of a circuit with a multitude of controlled secondary circuits has been published in the November/December, 1980, issue of the magazine "Powerconversion International", where, as FIG. 18, the state of the art of such circuitry is shown. There the output voltages $E_{02}$ to $E_{0M}$ are preregulated by inductive coupling of the chokes $L_2$ to $L_M$, the final regulation is obtained by conventional series regulation. Such a circuit is rather sumptuous concerning number and size of the required elements and has—due to the series regulation—a relatively low efficiency, as shown in the quoted litterature.

Hence a great share of the input power is to be dissipated as heat. The goal of the invention is a power supply of the kind named in the introductory part of claim 1 which overcomes the mentioned disadvantages and is characterized in claim 1.

By means of the drawings the idea of the invention is exemplified. They show.

Figure 1:
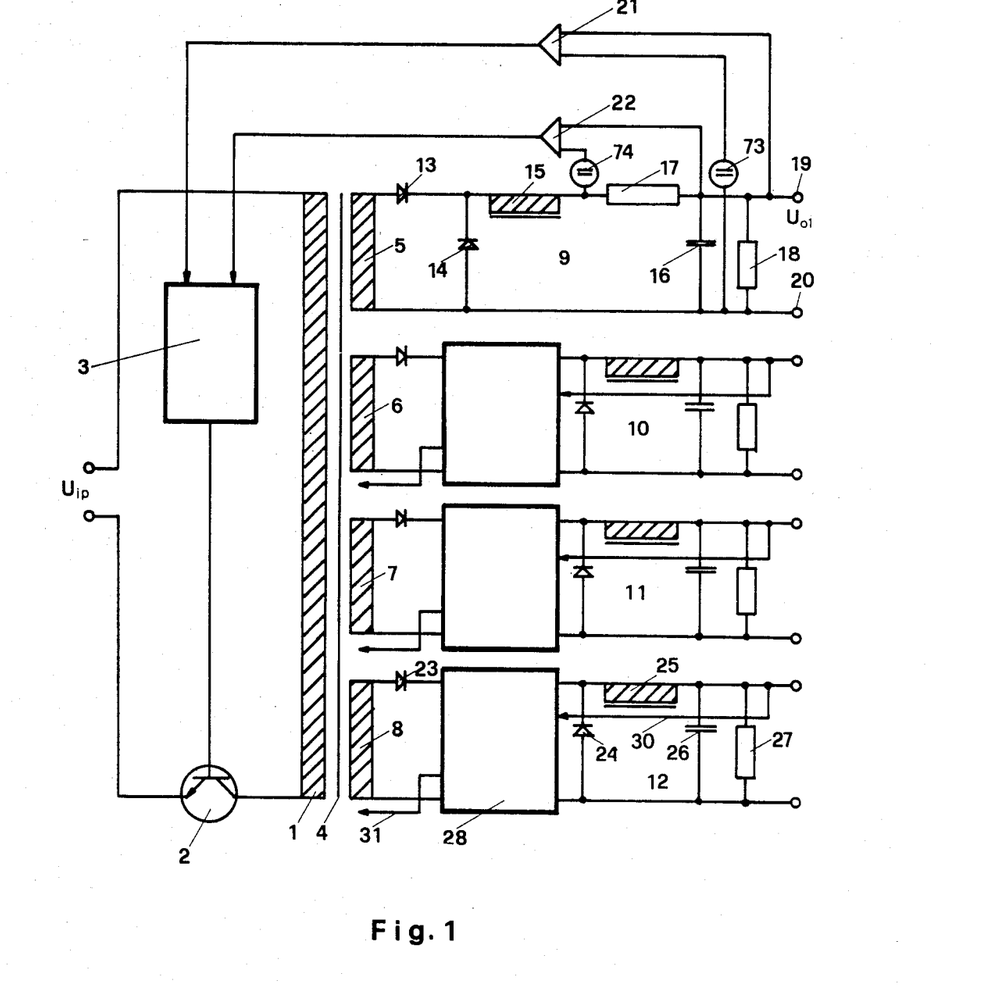
FIG. 1 a forward converter, partly as block diagram, as an embodiment of the invention, FIG. 2 a detail drawing of a forward converter as an embodiment of the invention, FIG. 3 the voltage response at a given point of the circuit diagram according to FIG. 2, FIG. 4 a flyback converter, partly as block diagram, as a further embodiment of the invention, FIG. 5 a secondary circuit of the embodiment shown in FIG. 4 in a detail drawing, FIG. 6 a dc-dc converter with resistive coupling as a further embodiment of the invention, FIG. 7 a forward converter as a further embodiment of the invention at which two secondary circuits are connected by resistive coupling, thereby one secondary circuit energizing the other one with dc, FIG. 8 a push-pull forward converter as a further embodiment of the invention.

The forward converter according to FIG. 1 comprises an isolation transformer 4 with a primary coil 1. It is energized by a current source (not shown) at a voltage $U_{ip}$, the first direct voltage. A switching element 2 embodied by a bipolar transistor is connecting the said current source periodically with the primary coil 1 with a frequency of 30 kc e.g., which frequency is produced by an oscillator contained in the control unit 3. The voltage at the primary coil 1 hence is a square wave oscillating between the values o and $U > U_{ip}$. The keying ratio is the ratio between the on-time and the total duration of the switching period. This keying ratio determines the power transferred to the secondary side of the transformer 4. This said secondary side comprises secondary coils 5,6,7,8, feeding the main circuit 9 and secondary circuits 10,11,12. The main circuit 9 comprising the said secondary coil 5, a rectifier diode 13, a by-pass diode 14, a choke 15, a storage capacitor 16, a measuring resistor 17, and a pre-load 18 is known in itself and represents the state of the art. Regulation of the voltage $U_{01}$ existing between the terminals 19,20 is performed in a way known in the art, in that the voltage $U_{01}$ is compared with the voltage of a reference source 73 in a regulation circuit 21 which in turn generates a control signal. This control signal then is fed back to the control unit 3 either directly (in the case of resistive coupling) or via a signal transformer or by optical coupling, again a method known in the art. By these means the keying ratio of the voltage $U_{ip}$ is controlled. A known short circuit protection is embodied here in that the current drawn from the secondary circuit 9 flows across the measuring resistor 17 thereby creating a potential difference along it. In case a preset current—and thus a preset voltage at the entrance port of a reference circuit 22—is exceeded, this said reference circuit 22 is transmitting an appropriate signal to the control unit 3 which in turn is reducing the keying ratio in accordance with the desired short circuit characteristic. The three more secondary coils 6,7,8 are feeding the three mutually indentical secondary circuits 10,11,12.

One such secondary circuit, e.g. the one termed 12 comprises the secondary coil 8, a rectifier diode 23, a by-pass diode 24, a choke 25, a storage capacitor 26, and a preload 27 here represented by a resistor. A regulation circuit 28 is part of this embodiment of the invention, which said regulation circuit 28 is connected with a lead 30 to the secondary circuit 12 on which lead 30 the output voltage of the secondary circuit 12 is transmitted. Said regulation circuit 28 on a further lead 31 transmits a signal to the control unit 3 in case the current drawn from the secondary circuit 12 is exceeding a preset value (short circuit protection).

Should resistive coupling to the control unit 3 not be desired, it can e.g. be coupled by a signal transformer or an optical coupling device (both not shown).

Figure 2:
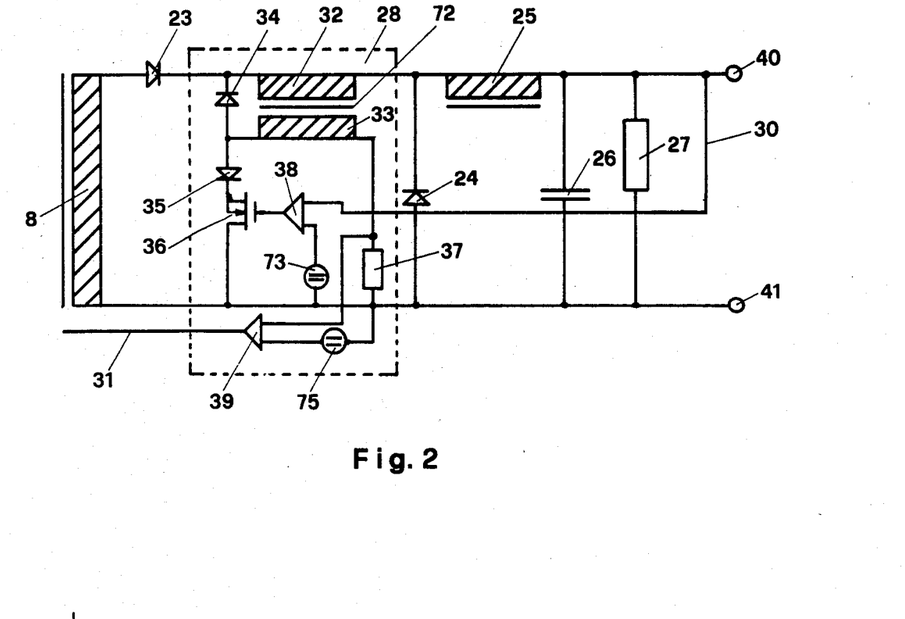

FIG. 2 is a detail drawing of secondary circuit 12 supplying a regulated voltage at its output connectors 40,41. The regulating circuit 28 is shown here also in detail. It comprises a transformer 72 consisting of coils 32,33, furthermore of two diodes 34,35, a switching element 36 such as a MOSFET, a measuring resistor 37 and two comparator circuits 38,39, with reference sources 73,75 respectively. The function of the circuit elements outside of the regulation circuit 28 is the same as in the secondary circuit 9, according to FIG. 1. Since the regulation circuit 28 cannot store any energy, the secondary coil 8 is so dimensioned that the time average of its output voltage (measured behind the rectifier diode 23) es exceeding by a certain fraction—e.g. 30%—the value of the stabilized direct voltage at the output connectors 40,41. In case the switching element 2 according to FIG. 1 is in the conduction state, the current in the secondary circuit 12 is rising and charging the storage capacitor. This current rise is inducing a current in the coil 33. If the switching element 36 is in the conduction state, the induced current flows through the diode 35, the switching element 36, and the measuring resistor 37 back into the coil 33. The voltage drop across the measuring resistor 37 is held small so that in this switching state the coil 33 of the transformer basically is shorted. If—as an example—the ratio of the numbers of windings of the coil 33 and 32 respectively is 4:1, in the exemplified switching state the feedback of the induced current to the coil 32 is the voltage drop across the mentioned elements 35,36,37, reduced by a factor of four. If, however the switching element is in the non conductive state, the current induced in the coil 33—with the said ratio of the numbers of windings this is ¼ of the current flowing through the coil 32—is flowing back to the source, respectively is reducing the current flowing out of the secondary coil 8. The voltage available behind the coil 32 therefore is reduced by approximately 25%.

It is well contained in the idea of the invention to design the secondary circuits without short circuit protection and therefore without measuring resistor 37. It is also contained in the invention to have the measuring resistor 37 in the main current path of the secondary circuits according to FIG. 2, e.g. anologous to the measuring resistor 17 in FIG. 1.

Figure 3:
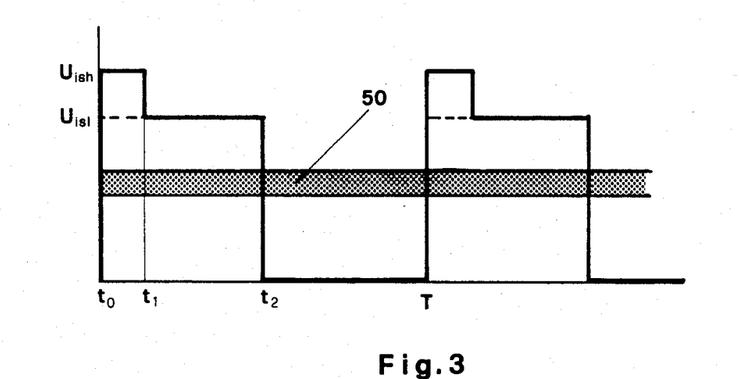

FIG. 3 is the drawing of the time development of the voltage following coil 32. $U_{ish}$ is the voltage available at the secondary coil 8, $U_{isl}$ is the value reduced by the voltage induced in coil 33. $t_0$ is the starting time of a switching period of switching element 2, T is the end of such a period and, at the same time, the beginning of the next one. At the time $t_0$ the switching element 36 is conductive and stays in this state until a time $t_1$, where it is driven into the nonconductive state. This action is caused by the comparator circuit 38 according to FIG. 2, which is comparing the voltage at the output connectors 40,41 with the voltage of the reference source 73 and therefrom is defining the ratio of on time to off-time of the switching element 36 by means of pulse-width-modulation. In FIG. 3 a band 50 in the voltage-time area designates the full width of regulation of the secondary circuit 12. The comparator circuit 39 is measuring the voltage drop across the measuring resistor 37 and is comparing it with the voltage of the reference source 75. In case a preset threshold is exceeded a signal is transmitted on lead 31 to the control unit 3 which signal is cutting off he switching element 2. Because the voltage drop across the measuring resistor 37 is proportional to the current in the secondary circuit 12, also this secondary circuit 12 is short circuit protected. The function of comparator circuit 39 is fully equivalent to the one of comparator circuit 22 according to FIG. 1.

Figure 4:
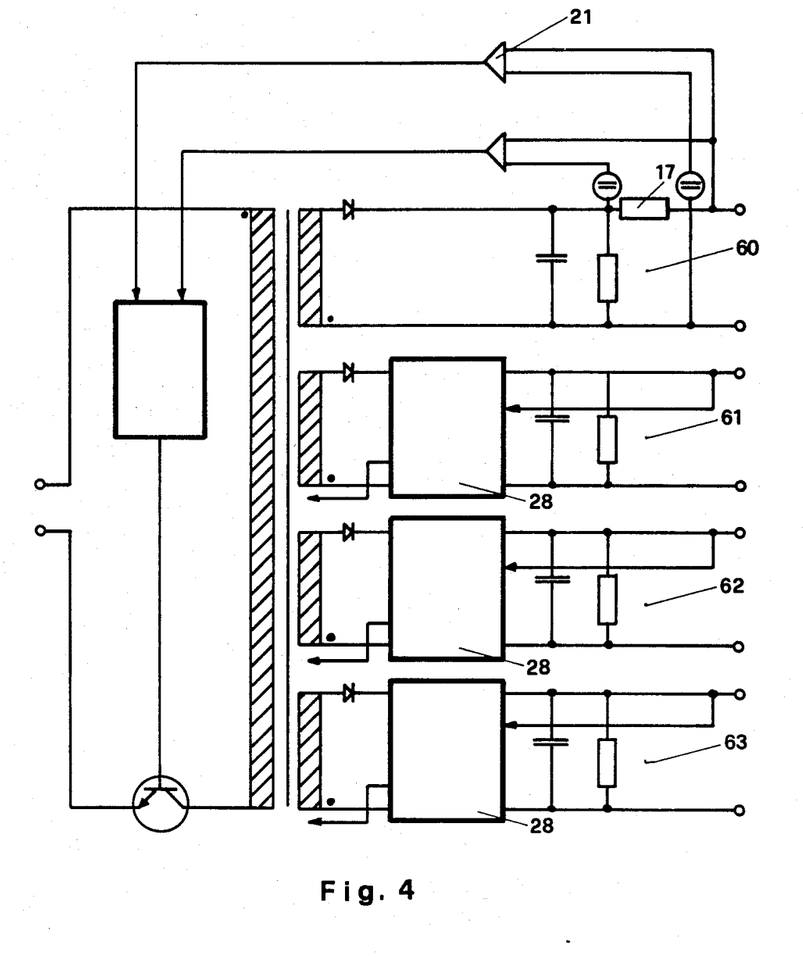

FIG. 4 is showing a forward converter as an embodiment of the invention. Again, there is a main circuit 60, and three secondary circuits 61, 62, and 63, which, in this present embodiment, have no resistive coupling among each other as well as to the primary side. Regulation of the main circuit 60 is effected as in the embodiment according to FIG. 1 via the regulation circuit 21; overload protection is also provided for and is working as described for FIG. 1 via the voltage drop across the measuring resistor 17.

Figure 5:
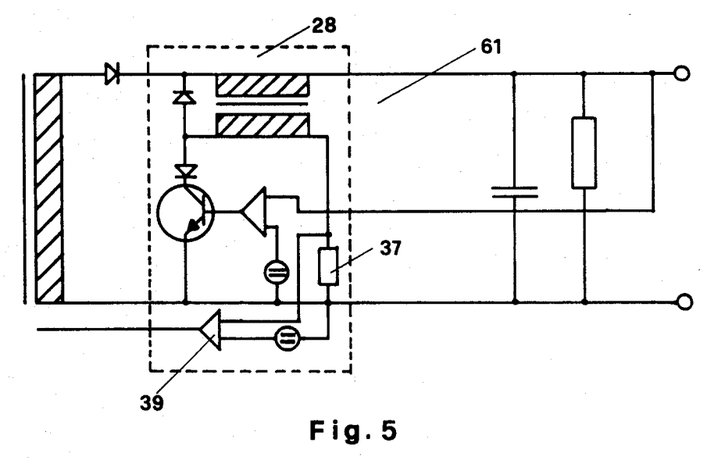

The regulation circuits 28 are wired into the secondary circuits 61, 62 63, equivalent to the regulation circuit 28 of FIG. 1. Their wiring is shown in detail in FIG. 5, but identical to the one of FIG. 2, Also here it is contained in the invention to omit the measuring resistor 37 and of course also the comparator circuit 39. It is further part of the invention to put the measuring resistor into the main current path and to monitor the voltage drop across it.

Figure 6:
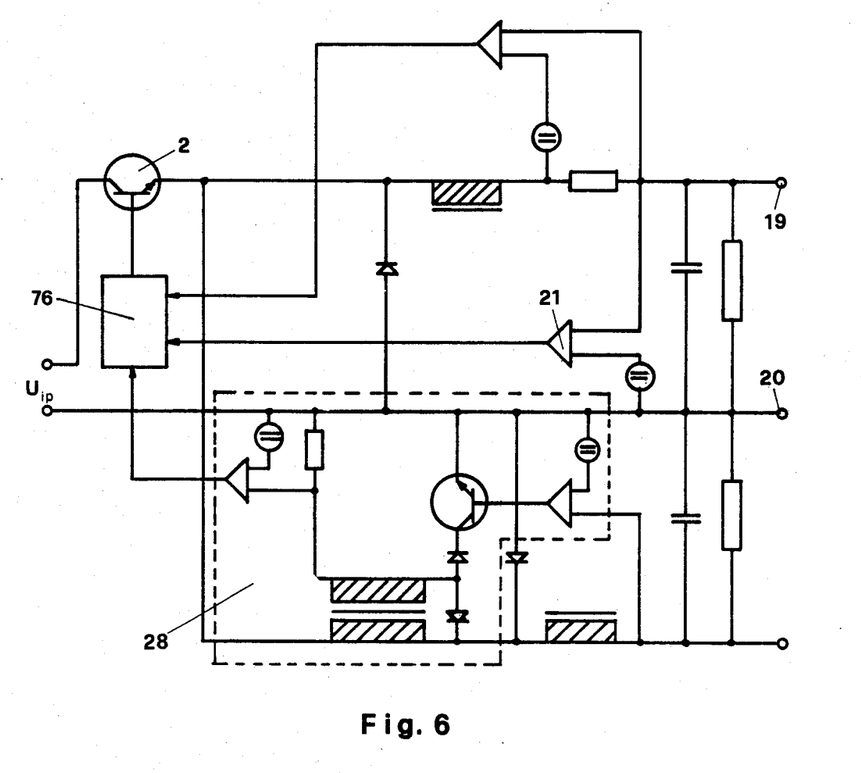

FIG. 6 is showing a dc-dc-converter with resistive coupling of primary and secondary sides. The primary side can be a mains rectifier with smoothing capacitor or a stabilized direct voltage. $U_{ip}$ is the actual value of this input voltage.

The switching element 2, here embodied by a bipolar transistor as in FIG. 1, is switching the voltage $U_{ip}$ on and off at a keying ratio defined by the regulation circuit 21 from the voltage between the connectors 19, 20. The switching element 2 is controlled by a control unit 76 containing also the (not shown) oscillator. The rest of the wiring of this main circuit is identical to the one of FIG. 1. The secondary circuit shown here is connected directly to the switching element 2 instead of to a separate transformer coil. The contents of regulation circuit 28 are again the same as the ones of regulation circuits 28 in FIGS. 1,2,4, and 5. As well in the main circuit as in the secondary circuits the overload protection can be omitted or shifted from the secondary circuits into the main circuit without leaving the idea of the invention.

Figure 7:
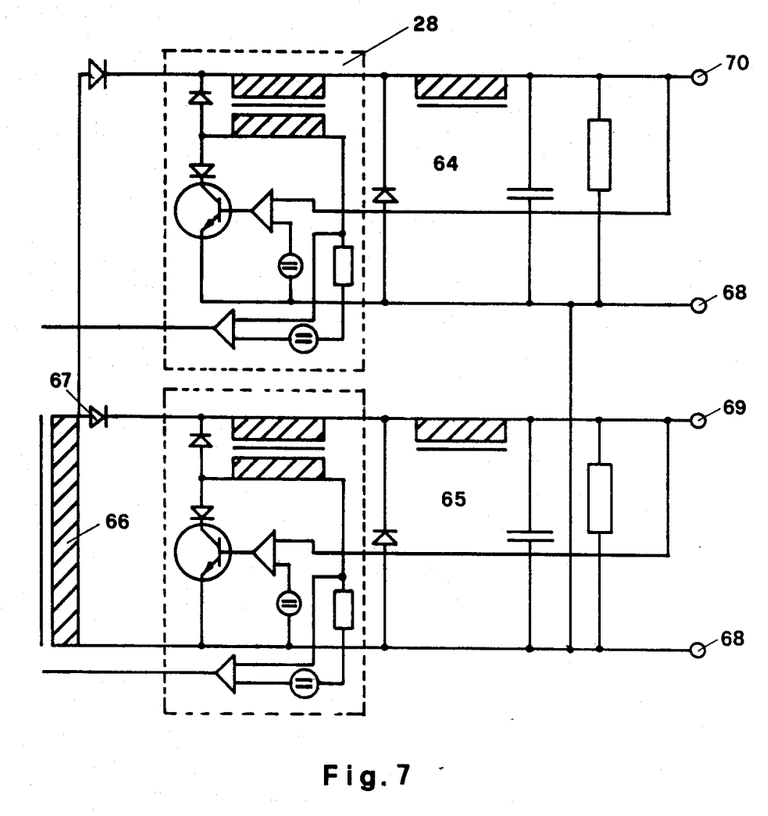

In the embodiment according to FIG. 7, a secondary circuit 64 is switched in parallel to the secondary circuit 65. Both secondary circuits 64, 65 are energized by the same secondary coil 66 and a rectifier diode 67 connected in series to the said secondary coil. Two regulation circuits 28 are stabilizing the volage between the output connectors 68, 69,70 respectively. The regulation circuits 28 are again identical to the ones explained before and bearing the same number.

Figure 8:
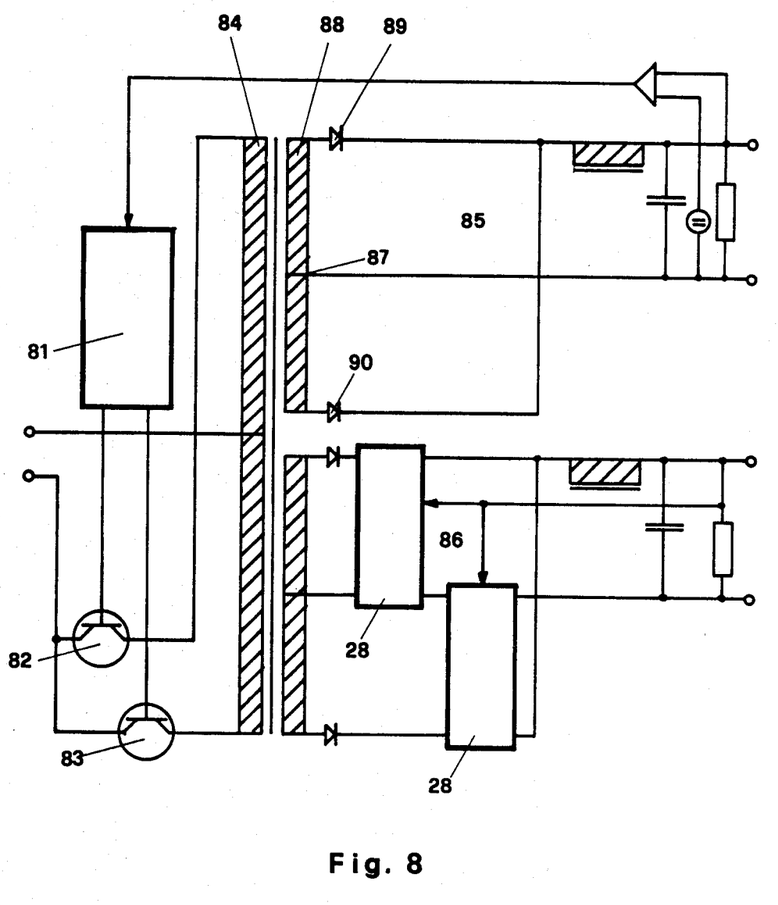

The embodiment according to FIG. 8 is based on a push-pull-flyback converter. The primary side of it consists of a current source of voltage $U_{ip}$ (not shown), a control unit 81, two switching elements 82,83 connecting alternately one half of a primary coil 84 with the said current source. The secondary side of the converter comprises a main circuit 85 and—e.g.—one secondary circuit 86. The two ports of the secondary coil 88 are connected to the storage choke 15 via the diodes 89,90 having adequate polarity, which choke 15 is feeding the capacitor 16 with the smoothed current. The polarity of the regulation circuit is again the same as in the embodiment according to FIG. 1. A short circuit or overload protection as in the previous embodiments is omitted here. The secondary circuit 86 comprises two regulation circuits 28 with identical internal wiring as shown in FIG. 2, with the exception of the short-circuit protection, which has been omitted here too. The information about the output voltage of the secondary circuit is transmitted to the regulation circuits by means of a lead 91 equivalent to the lead 30 of FIG. 1.

I claim:

1. Switched mode power supply with at least one regulated secondary circuit characterized in that it is comprising a regulation circuit (28) in every one of the secondary circuits, which regulation circuit (28) is comprising each at least the following elements: a transformer (72), two diodes (34,35), a switching element (36), a comparator circuit (38) with reference source (73) and means for pulse-width modulation, which is further characterised in that the primary coil (32) of the transformer (72) in the main current path is connected in series to a rectifier diode (23) of the secondary circuit, that one end of the secondary coil (33) of the transformer (72) is connected to the primary coil (32) and the diode (23) via the diode (34), that the one end of the diode (35) is also connected with the said end of the secondary coil (33) whereas the other end of the diode (35) is connected to one current port of the switching element (36), that the other current port of the switching element (36) is connected to the same lead as the other end of the secondary coil (33) to which lead is connected also the output connector (41), that one entrance of the comparator (38) is connected directly to the other output connector (40), the other entrance of comparator circuit (38) is connected to the output connector (41) via the reference source (73), whereas its outlet is connected to the signal port of the switching element (36).

2. Switched mode power supply according to claim 1, chacterized in that the regulation circuit (28) additionally contains a measuring resistor (37) and a comparator circuit (39) with a reference source (75) where the measuring resistor (37) is connected in series to the secondary coil (33) of the transformer (72), whereas the one end of the secondary coil (33) which is connected the measuring resistor (37) is also connected to one entrance of the comparator (39), while its other entrance is connected the output connector (41) via the reference source (75), that the outlet of the comparator (39) is connected to the primary side of the switched mode power supply by means of a lead (31) on which a signal is tansmitted in order to produce the keying ratio of the switching element (2) in case the voltage drop across the measuring resistor (37) is exceeding the voltage of the reference source (75).

3. Switched mode power supply according to claim 1, chacterized in that a measuring resistor (37) is wired outside of the regulation circuit (28) in the main current path of the secondary circuit immediately adjacent to the output connector (40), that this output connector (40) is connected to the one entrance of a comparator circuit (39), that the other entrance of the comparator circuit (39) is fed by the other end of the measuring resistor (37) via a reference source (75), whereas the outlet of the comparator circuit (39) is connected to the primary side of the switched mode power supply by means of a lead (31) on which a signal is transmitted in order to reduce the keying ratio of the switching element (2) in case the voltage drop across the measuring resistor (37) is exceeding the voltage of the reference source (75).

4. Switched mode power supply according to claims 1, or 2, or 3, charcterized in that the switching element (36) is a bipolar transistor.

5. Switched mode power supply according to claims 1, or 2, or 3, characterized in that the switching element (36) is a MOSFET.

6. Switched mode power supply according to claims 2, or 3, characterized in that the lead (31) is connected directly to the primary side of the switched mode power supply.

7. Switched mode power supply according to claims 2, or 3, characterized in that the lead (31) is connected to the primary side of the switched mode power supply via an isolation transformer.

8. Switched mode power supply according to claims 2, or 3, characterized in that the lead (31) is connected to the primary side of the switched mode power supply via an optical coupling device.

* * * * *